Aug. 27, 1935. T. J. TRAVIS 2,012,554
AUTOMOBILE JACK
Filed April 27, 1935
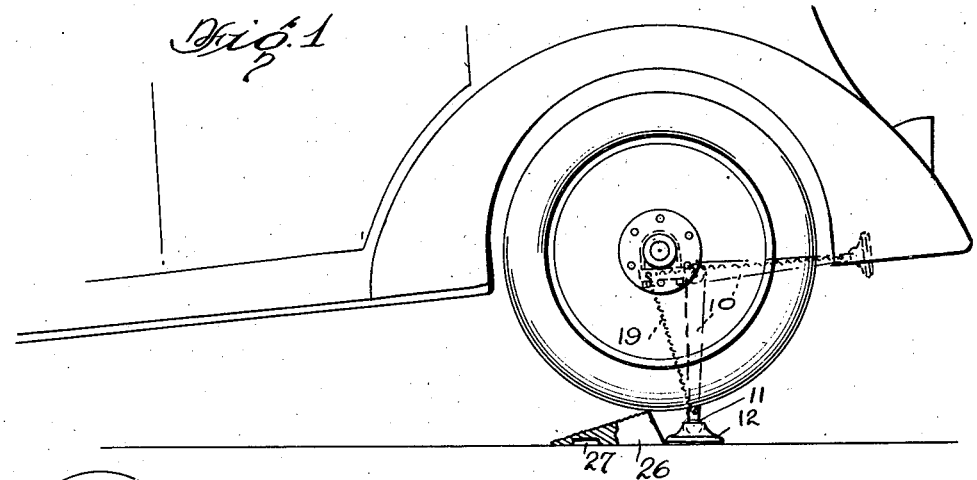
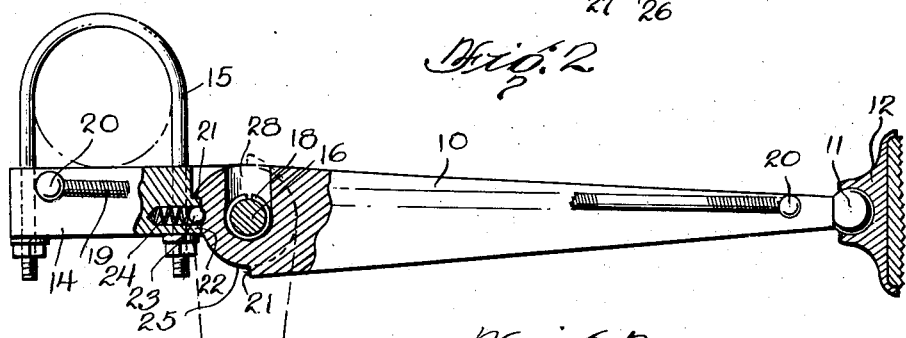
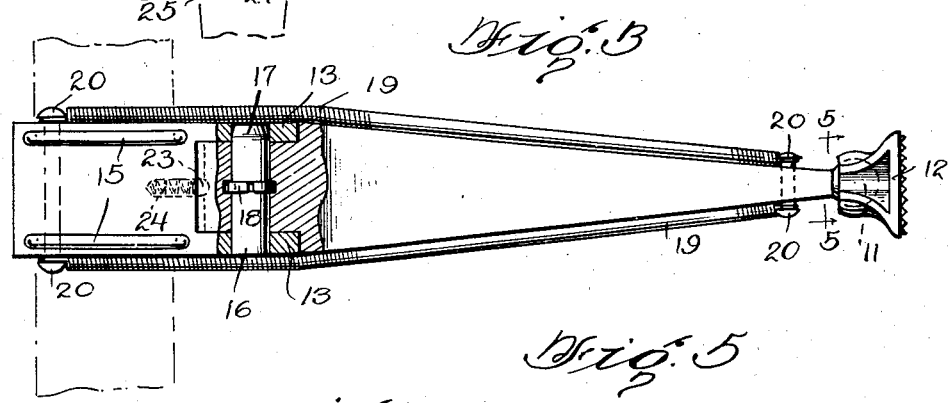
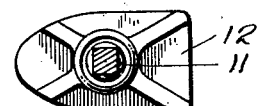
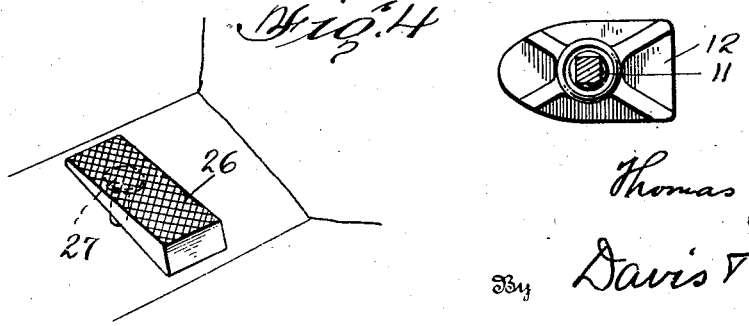
Inventor,
Thomas J. Travis,
By Davis & Davis
Attorneys Patented Aug. 27, 1935

2,012,554

UNITED STATES PATENT OFFICE 2,012,554

AUTOMOBILE JACK

Thomas J. Travis, Metairie Ridge, La.

Application April 27, 1935, Serial No. 18,655

3 Claims. (Cl. 254—1)

This invention has relation to that type of jack which substitutes for manual power, the power of the car engine to raise and prop up the axle to enable a wheel to be changed, and the object of the invention is to simplify and improve the device to render it durable and simple in construction, as more fully hereinafter set forth.

In the drawing,

Fig. 1 is a side elevation of the rear end of an automobile showing my prop or jack in position to prop up the car far enough to permit the wheel to be removed;

Fig. 2 is a view partly in vertical section and partly in side elevation showing the jack or prop swung upwardly to non-use, out-of-the-way position;

Fig. 3 is a view partly in plan and partly in horizontal section of the device shown in Fig. 2; and Figs. 4 and 5 are views of details.

Referring to the drawing annexed by reference numerals, 10 is a leg or prop having a ball 11 at one end to which is connected, in the manner to form a ball-and-socket joint, a foot-piece 12. The other end of this leg is shaped to fit between a pair of ears 13 carried by a block 14 which is adapted to be affixed in any suitable manner to the axle casing or to a spring. In the present instance, the block 14 is shown as fastened to the axle casing by means of screw bolt 15.

The prop or leg 10 is pivotally mounted between the ears 13 by means of a horizontal pivot 16 which passes through holes in the ears 13 and a hole in the prop. One end 17 of this pin is bevelled off to facilitate its insertion in the holes, and in order to lock the pin movably in place, I use a spring collar 18 which fits in an annular groove in the upper end of leg 10 and normally tends to clasp the pin 16, an annular groove being formed in the pin to receive this split ring 18. In this way, I avoid the necessity of using a headed bolt having a nut for fastening the pin in place, while at the same time the pin may be driven out, if it be desirable to dismantle the device.

A pair of retractile springs 19 connects the outer end of the prop 10 to the anchoring block 14, the ends of these springs being fastened respectively to the block and the prop by means of pins 20. The pins are so positioned with reference to the pivot pin 16 that when the prop is swung upwardly to its non-use position, as shown in Fig. 2, these springs will lie above the center of said pivot 16 and thus normally hold the prop or leg in its upper, non-use position, in which position it will be practically horizontal. But when the prop is swung downwardly to be put into use, the springs pass downwardly over the center of pin 16 and thus exert their normal tendency to swing the outer end of the prop downwardly toward the road-bed. To limit the movement of the prop, I provide the prop with two shoulders 21 which are adapted to abut the lug 22 carried by the block 14; these shoulders and the lug obviously limit the upward swing of the prop and also limit its swing downwardly so that it cannot swing beyond the vertical.

For the purpose of locking the leg in its horizontal position, I provide a ball latch 23 within a recess in block 14 and normally pressed toward the leg by means of an expansible spring 24 mounted in a recess in block 14. This ball normally runs on an arcuate surface 25 formed on the adjacent end of the leg, this surface being described from the center of the pivot pin 16. The purpose of this spring actuated latch ball 23 is to support the leg in its non-use position in such manner that it will not jar loose and vibrate or rattle, but so that a slight downward pressure by the hand on the outer end of the leg will release the catch and permit the leg to be swung downwardly far enough to carry the springs over center and permit the springs to automatically swing the leg toward the road-bed.

When it is desired to elevate one of the wheels for any purpose, I place behind the same a small ramp 26, then throw the prop downwardly far enough to put its springs in action and cause its foot-piece 12 to bear upon the road-bed, and then the car is backed so as to carry its adjacent wheel up to the top of the ramp, whereupon the prop will automatically swing downwardly and forwardly to a vertical position, where it will serve as a prop to support the wheel off the road. After the desirable job is done and the wheel is replaced, the ramp is reversed and placed in front of the wheel tire and the car is driven forwardly; and when the wheel reaches the top of the ramp, the foot-piece of the leg will be raised slightly off the road-bed and then as the car moves on in a forward direction and the wheel drops off the ramp, the leg will strike the road-bed and be swung backwardly (owing to the forward motion of the car and the engagement of the foot with the ground) until the springs are carried across center, whereupon the leg will normally swing up to horizontal position and be latched in that position. It will be understood that the ramp is sufficiently high to lift the car far enough to permit the leg to swing to a vertical position, i. e. until its lower stop 21 strikes solidly against the lug 22. The ramp 26 may be used as a pad for the accelerator pedal by providing a recess 27 in its underside, as shown in Fig. 4.

The universal support for pad 12 is advantageous in that it will adjust itself to the road-bed surface readily and therefore provides a substantial, secure support for the prop leg. For convenience in inserting the spring ring 18 in position, I provide the top surface of the prop leg with a slot 28.

I claim:

1. An automobile jack of the type set forth, a supporting member and means for attaching it to a part of the car, said supporting member carrying a pair of ears, a prop leg pivotally mounted between said ears and provided with a pair of separated stop shoulders, said supporting member being provided with cooperating shoulders, as set forth, and a retractile spring connecting the free end of the prop leg to the supporting member at a point beyond said pivot, the point of connection of this spring being such that when the prop leg is swung to its upward position the spring will be above the center of said pivot and thus hold the prop leg in its upper non-use position, and when swung downwardly to use position the spring will be positioned to the opposite side of the center and thus tend to swing the free end of the leg downwardly against the road-bed.

2. An automobile jack of the type set forth, a supporting block having means for attaching it to a part of the car, a prop leg pivoted to one side of said block, said prop leg being provided with two spaced shoulders formed at the inner end thereof and said block being provided with a projecting leg forming a stop shoulder on each side of the leg to engage the shoulders on the prop leg to limit its down and upward movements, and cooperating means on the supporting block and the prop leg for locking said prop leg in its raised and horizontal position.

3. An automobile jack of the type set forth, a supporting block having means for attaching it to a part of the car, a prop leg pivoted to one side of said block, said prop leg being provided with two spaced shoulders formed at the inner end thereof and said block being provided with a projecting lug forming a stop shoulder on each side of the lug to engage the shoulders on the prop leg to limit its down and upward movements, and cooperating means on the supporting block and the prop leg for locking said prop leg in its raised and horizontal position, said cooperating means embodying a spring-pressed detent mounted in the support block and a recess in the end of the prop leg between the spaced shoulders thereof.

THOMAS J. TRAVIS.